(12) United States Patent
Harrison et al.

(10) Patent No.: US 12,263,588 B2
(45) Date of Patent: Apr. 1, 2025

(54) CONTINUUM ARM ROBOT JOINT

(71) Applicant: ROLLS-ROYCE plc, London (GB)

(72) Inventors: Liam D Harrison, Derby (GB);
Andrew D Norton, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/509,662

(22) Filed: Nov. 15, 2023

(65) Prior Publication Data
US 2024/0189983 A1   Jun. 13, 2024

(30) Foreign Application Priority Data
Dec. 7, 2022  (GB) ...................................... 2218369

(51) Int. Cl.
*B25J 9/06* (2006.01)
*B25J 9/10* (2006.01)
*B25J 9/12* (2006.01)
*B25J 19/00* (2006.01)

(52) U.S. Cl.
CPC .............. *B25J 9/065* (2013.01); *B25J 9/102* (2013.01); *B25J 9/12* (2013.01); *B25J 19/0025* (2013.01)

(58) Field of Classification Search
CPC ..... B25J 9/065; B25J 9/102; B25J 9/12; B25J 19/0025
USPC ........................................................ 74/490.01
See application file for complete search history.

(56) References Cited

U.S. PATENT DOCUMENTS

2006/0199999 A1   9/2006  Ikeda et al.
2021/0383937 A1*  12/2021 Petrosky ................ B25J 11/008

FOREIGN PATENT DOCUMENTS

| DE | 10 2006 018 472 A1 | 11/2006 |
| FR | 3 032 645 A1 | 8/2016 |
| JP | 2011-52805 A | 3/2011 |

OTHER PUBLICATIONS

Jun. 6, 2023 Search Report issued in British Patent Application No. 2218369.3.
Apr. 30, 2024 Extended European Search Report issued in European Patent Application No. 23208838.5.

* cited by examiner

*Primary Examiner* — T. Scott Fix
(74) *Attorney, Agent, or Firm* — Oliff PLC

(57) ABSTRACT

A section of a continuum arm robot including a pair of pivot points at a first and second end of the joint, the section further having a first and second connecting rod connected to the section and joining at the centre of the section, the connecting rods has a plurality of gear teeth at the peripheral ends of the connecting rod that intermesh at a central point on the section.

14 Claims, 5 Drawing Sheets

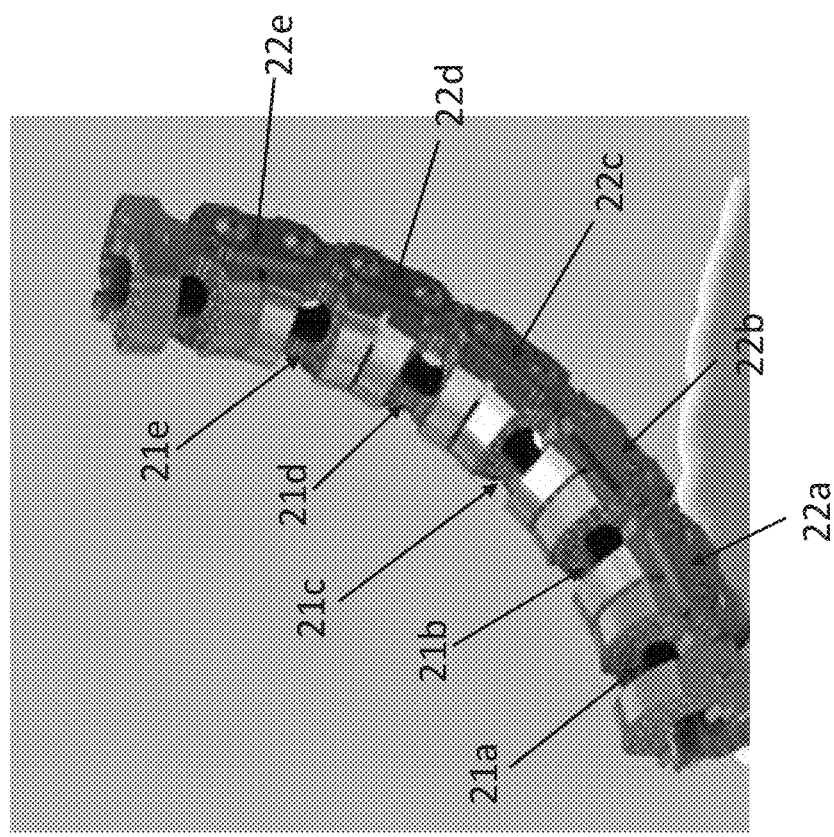

CONTINUUM ARM ROBOT JOINT

Figure 1B:
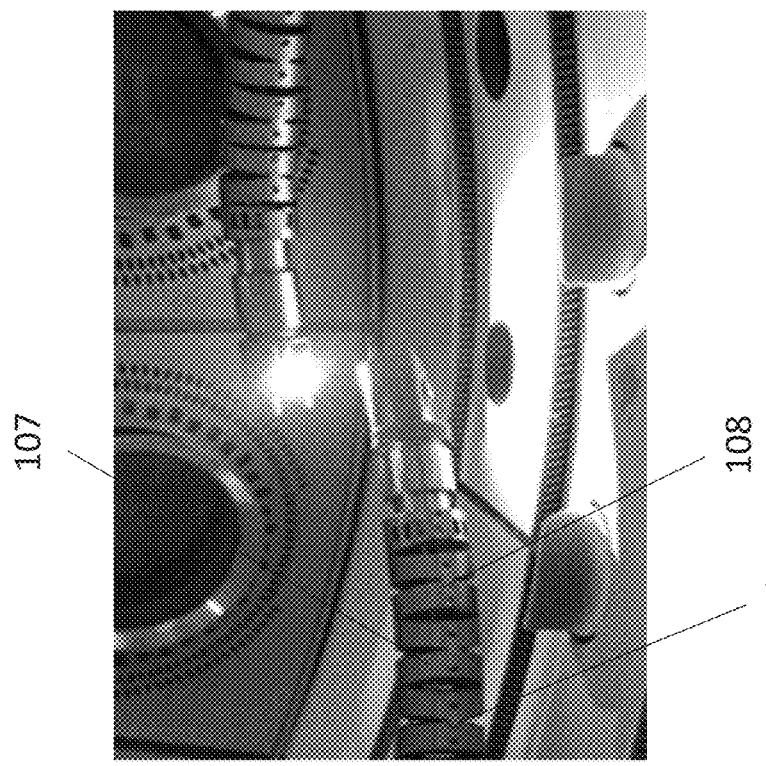

This specification is based upon and claims the benefit of priority from UK Patent Application Number 2218369.3 filed on 7 Dec. 2022, the entire contents of which are incorporated herein by reference.

BACKGROUND

Overview of the Disclosure

The disclosure relates to a joint section for the active part within a continuum robot. The disclosure also relates to a continuum robot having joints with a fixed degree of movement.

Background of the Disclosure

Continuum arm or snake arm robots are of growing interest in a number of applications. This is because the robots can be manipulated into spaces in which other robotic systems or human operators can not readily access. This is due to the ability to manipulate the body with a number of degrees of freedom so that the end tool can be positioned accurately and easily. This positioning is controlled by actuators which manipulate the tendons within the robot so that each joint of the arm can be individually controlled to within a high degree of positional accuracy.

Despite the use of the continuum arm robots within these applications there are limitations to the use of continuum arm robots because of the deflection across their joints that they suffer when they are under load. This deflection reduces the accuracy of positioning of the robots and means that a greater number of sensor systems required to accurately model the robot and to determine its movement. The reason for the deflection at the joints is due to the spring nature of the joints, which are sensitive to external forces, including the weight of the robot arm itself as well as the effect of any force applied by the end effector or payload being supported. Due to the deflection, the joints are designed with hard stops in place to prevent them from over-extending and potentially damaging the robot arm. These stops ultimately have an effect on the eventual shape and flexibility that the arm can achieve. Therefore, there is a need to improve the joint sections within continuum arm robots to overcome the above listed limitations.

Overview of the Disclosure

According to a first aspect of the disclosure there is provided a section of a continuum arm robot comprising a pair of pivot points at a first and second end of the joint, the section further having a first and second connecting rod connected to the section and joining at the centre of the section, the connecting rods has a plurality of gear teeth at the peripheral ends of the connecting rod that intermesh at a central point on the section.

The connecting rods may have between 2 and 7 teeth at the ends of the connecting arms.

The joint sections may have an annular cross-section with a hole at the centre of the joint section.

There may be a plurality of channels passing around the outside edge of the joint sections for actuator cables of the continuum arm robot to pass through.

There may be two identical connecting rods provided on opposite sides of the joint sections.

The joint sections may be made from a plastics or metallic material.

The connecting rods may be made from a plastics or metallic material.

The at least one connecting rod may be removably connected to the joint section.

The joint section may have an oval or elliptical shape with the connecting rods being positioned on the sides having a smaller radius.

The pivot points at the first and second end of the joint section may comprise a plurality of gear teeth.

According to a second aspect of the disclosure there is provided a continuum arm robot system, wherein the manipulatable section of the arm is constructed from a plurality of joint sections according to the first aspect of the disclosure, wherein the adjacent sections are connected by the connecting rods and the pivot point between the first and second end of the section interact with the pivot points at the end of adjacent sections.

Each joint section may be coupled to a pair of actuator cables mounted on either side of the joint section.

The continuum arm section may be connected to an actuator pack, which is mounted to the proximal end of the continuum arm robot.

Each joint section may have an electric motor, or piezo electric actuator at the centre of the joint section.

The pair of joint sections may be mounted having the connecting rods aligned in the same axis, whilst the adjacent pair of joints has the connecting rods aligned in an axis orthogonal to the other pair of joint section.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DISCUSSION OF THE FIGURES

Figure 1A:
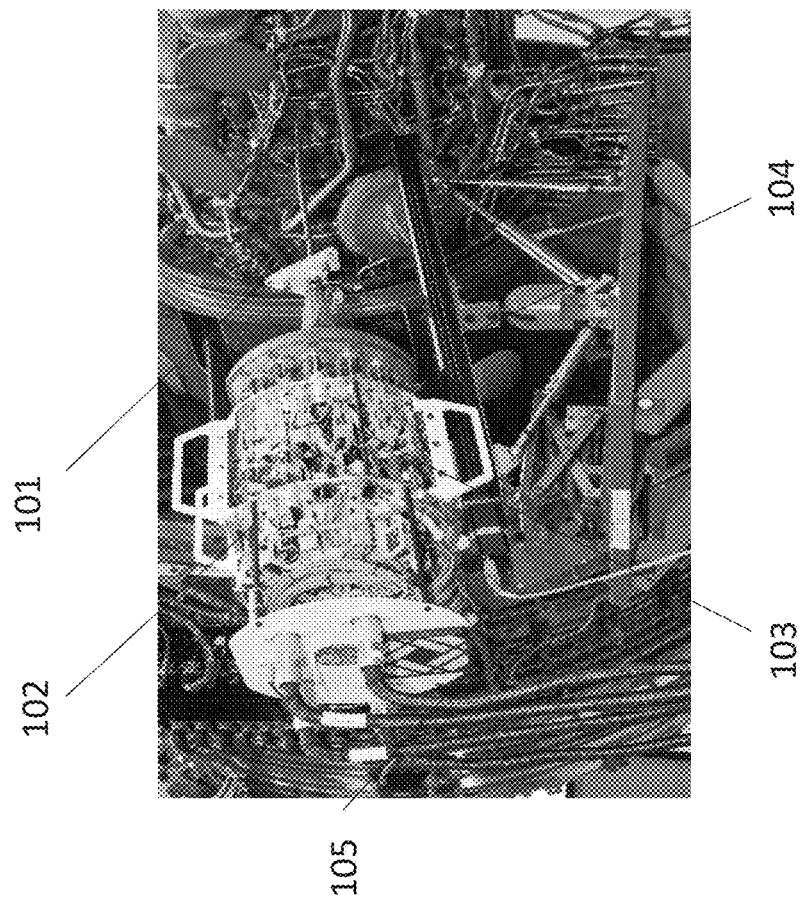
Figure 2:
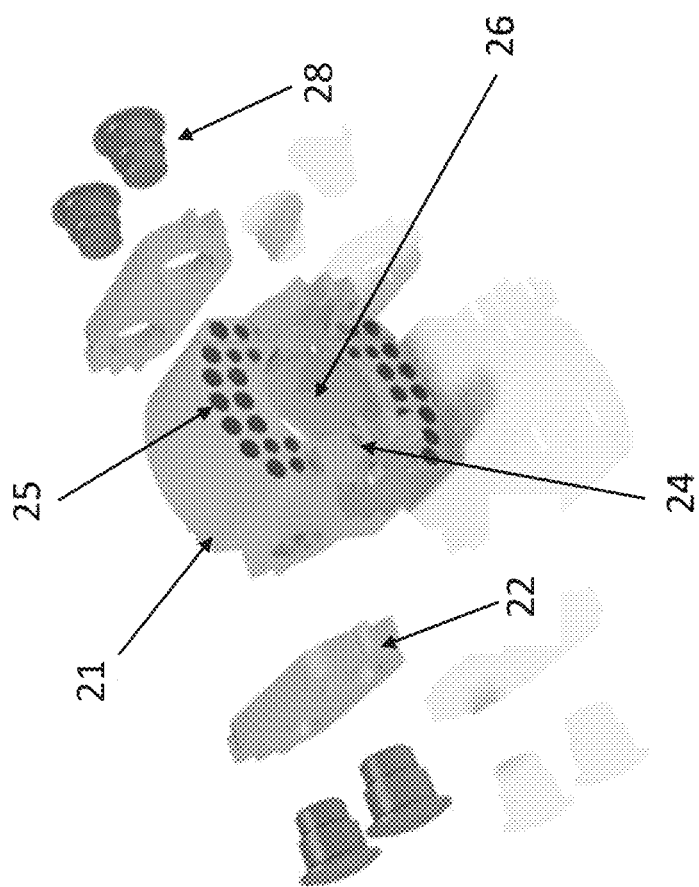
Figure 3:
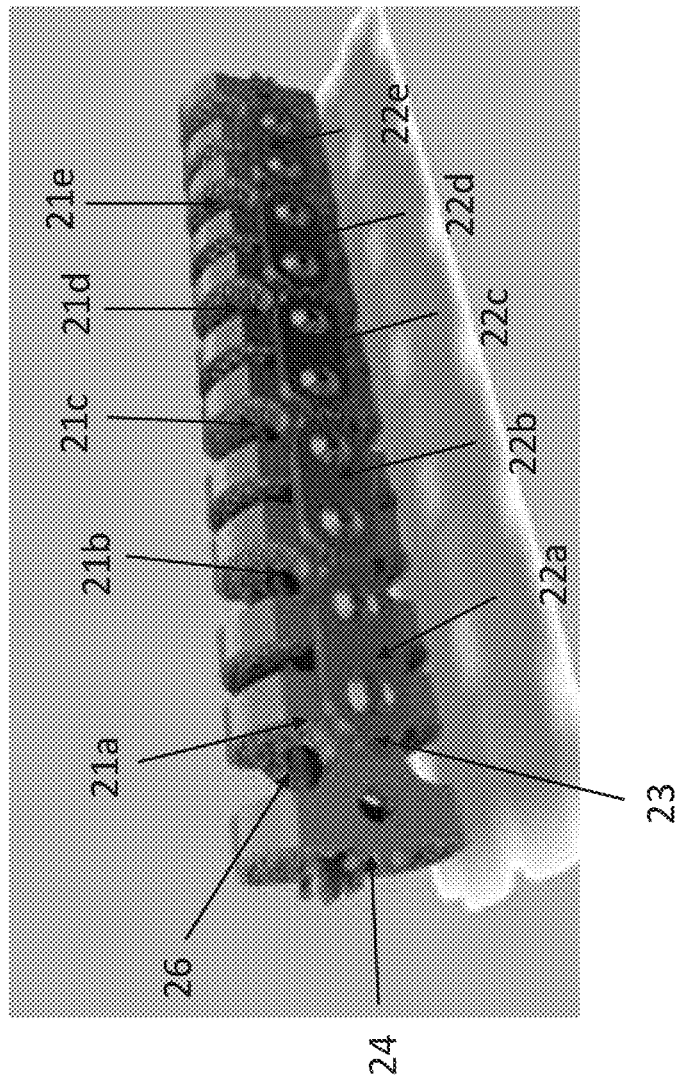
Figure 4:
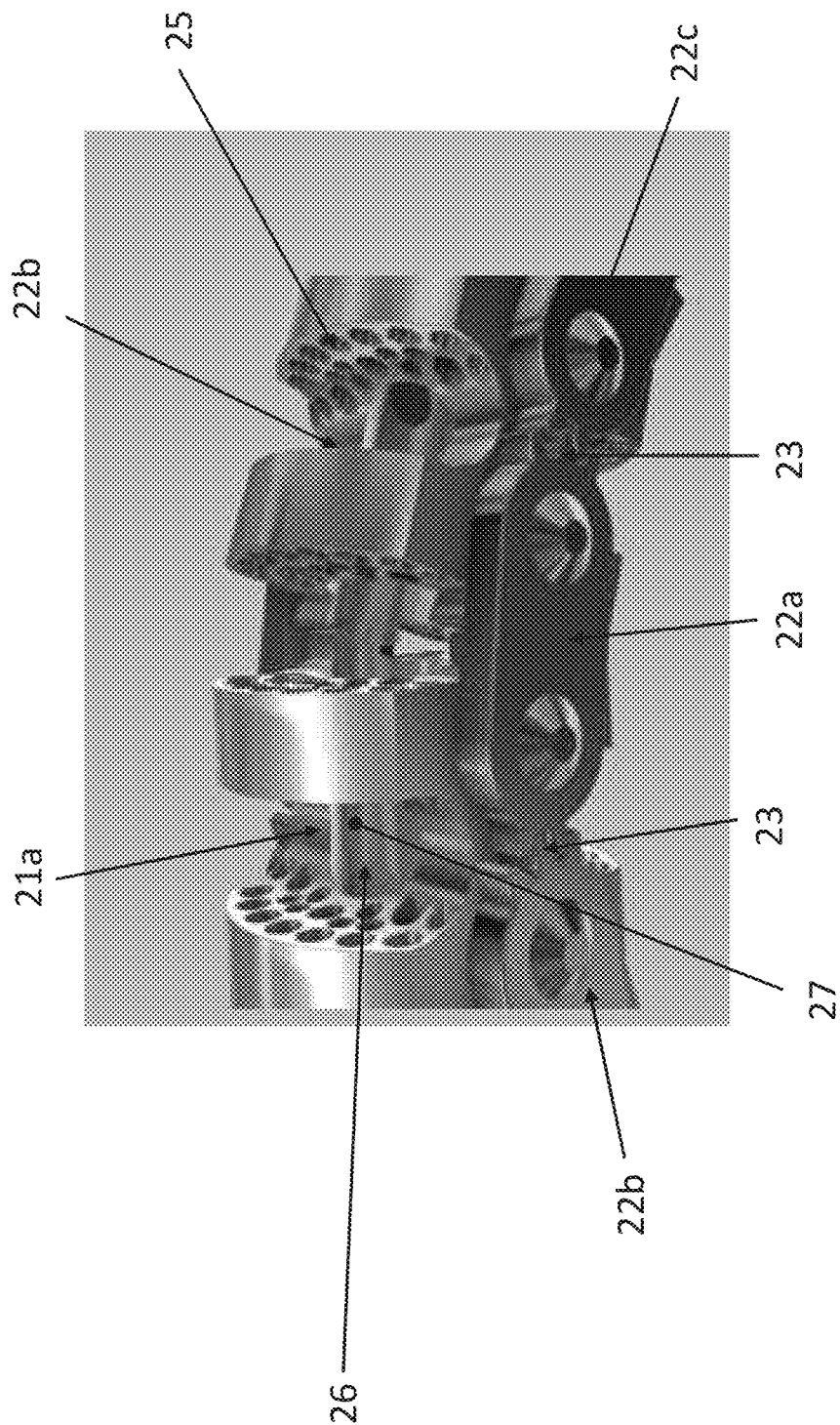

Embodiments will now be described by way of reference only, with reference to the figures in which:

FIG. 1a presents a prior art example of a cut away of a continuum arm robot;

FIG. 1b shows an example of the joints of a continuum arm robot;

FIG. 2 presents an example of a joint section or vertebra according to the present disclosure;

FIG. 3 presents an example of a section of a continuum arm robot according to the present disclosure;

FIG. 4 presents a close-up of a section of a continuum arm robot according to the present disclosure; and FIG. 5 presents an alternative example of a section of a continuum arm robot according to the present disclosure.

DETAILED DESCRIPTION OF THE DISCLOSURE

Aspects and embodiments of the present disclosure will now be discussed with reference to the accompanying figures. Further aspects and embodiments will be apparent to those skilled in the art.

FIG. 1a presents a prior art example of a cut away of a continuum arm robot. The prior art continuum arm robot comprises the continuum arm robot portion 101 permanently integrated and extending out from the actuator pack 102. The actuator pack 102 contains a plurality of independent actuators 103. These actuators are used to modulate the tension within the tendons that run through the continuum arm 101. The tendons are associated with joints within the arm; each of these joints is designed to move in response to a tensioning or relaxing of the tendon associated with the joint. This tensioning or relaxing of the tendon therefore causes a contraction or extension of the joint; this, allows the continuum arm to bend. The actuator pack is shown being positioned on a rail or support 104, which is positioned close to the component that is to be inspected. The actuator is also provided with a plurality of power and signal cables 105 that are used to power and address the actuators. The individual signals across the range of actuators provide control of the joints such that the continuum arm 101 can be directed. Not shown in FIG. 1, is that there is also a need for an operator with a computing device that is linked to the actuator to control movement of the continuum arm and to perform the desired task. This increases the operating cost for the application. The computing device that is connected to the prior art actuator may be any suitable computing system such as a laptop computer featuring the requisite operating software for the robot and a control input such as a joystick, which allows the continuum arm to be controlled.

FIG. 1*b* shows an example of the joints of a continuum arm robot. The arm comprises multiple joints, which require at least 2 cables per joint. For example, a system having three joints, each having 4 tendons per joint will require 12 actuators to drive the arm. To increase the number of joints either the number of actuators needs to be increased or the number of tendons per joint needs to be reduced. Highlighted joints 106, 107, 108 are able to be manipulated to move in three dimensions. The joints are configured so that joints 106 and 108 are able to be able to flex in the same plane relative to the centre of the arm, whilst the plane that joint 107 is able to move in is offset by 90° to joints 106 and 108. It is through this repeating configuration of alternating joint angles, each of which results in the movement in different orthogonal plane, that allows the arm to be manipulated in three dimensions. Each joint within the arm has a limit to the amount they are able to flex; this is defined by the design of the arm and the materials that are used. The limit of flex in each joint sets the characteristics of the robot such as the minimum bending radius and the torque that is required to cause a resultant change of angle within the joint. At the end of the arm there is positioned a tool or probe that is designed to perform one or more functions, once the continuum arm is in position. The heads of the continuum arm robots are often provided with optical systems so that the operator is able to view the head as it is being inserted into the component and to control the head as it performs its tasks. The optical system is also frequently coupled to an illumination system. The control cables for the tool/end effector, electrical power connectors to the illuminations system, and optical cables are usually able to run through the centre of the joints within the continuum arm. This has the benefit of protecting the cables form any potential damage.

FIG. 2 presents an example of a joint section of vertebra according to the present disclosure. The exploded schematic presents the joint section 21 having are intermeshing gears 24 at the first and second ends of the joint section. In FIG. 2 there are two sets of intermeshing gears on the first and second sides of the joint section. However, there may only be a single intermeshing gear on the first and second sides of the joint. A pair of connecting rods 22 are shown extending towards the rear of the arm. These connecting rods have geared teeth 23 that allow them to connect with adjacent connecting rods that link the joint section with another joint section. The connecting rods are shown having two and three teeth at the ends of the connecting rods, however they may have any suitable number. The number and size of the teeth will depend upon the level of accuracy of the movement that is required by the arm. The example shows that the connecting rods are attached to the joint section through the use of pins 28. The joint section is also shown having an annular structure with centre passage 26 allowing space for cables on conduits to be housed. These cable and conduits may be used to supply an end effector, which can be connected to the end of the arm. The end effector may be a camera system. The end effector may be a tool: for example, this could be a cutting, drilling or grinding tool, alternatively, it could be a tool to apply a coating, such as spray coating. Around the centre passage 26 there are a plurality of smaller channels 25. These channels allow for the actuator cables for the robot arm to pass.

FIG. 3 presents an example of a section of a continuum arm robot according to the present disclosure. In this there are a plurality of robotic joint sections 21*a*, 21*b*. 21*c*, 21*d* and 21*e*. Each section is made of an open-section that is pivotably connected to its neighbouring section by pivot points at the first and second ends of the section. The first and second ends may be the proximal and distal ends of the section as the section would fit into a robot arm. The pivot point may be intermeshing gears 24 as shown in FIG. 2. Alternatively, they may pivot about an axle or a pin. The adjacent sections are connected to each other using connecting rods 22*a*, 22*b*, 22*c*, 22*d*, 22*e* which have geared teeth 23 which connect to adjacent connecting rods. The connecting rods are shown to couple at the centre of points of neighbouring sections, whilst being shown connected at a third of the way along the neighbouring sections in a region where the section is large. Although the connection and engagement may be done at any suitable point. The connecting rods of sections connect together, so that the gear teeth of adjacent connecting rods are meshed together. The connecting rods may be mounted external to the section. The connecting rod may be mounted internal to the section. The sections may have a hollow centre 26 to allow for the passage of conduits carrying power or air, or cables to the end effector. It may also carry the actuator cables that link the joint sections to the actuators on the actuator pack. Additionally or alternatively, channels can be made around the annular centre 26 to allow for the passage of the actuator cables. The joint sections may be made from any suitable material. The joint sections may be made of plastics or metallic materials. For example, the joint sections may be made from aluminium or titanium or alloys of these materials. Alternatively, they can be made from a high-density plastic material. The connecting rods can similarly be made from metallic or plastics material. For example, the connecting rods may be made from aluminium or titanium or alloys of these materials. Alternatively, they can be made from a high-density plastic material. Depending on the level of control required the connecting rods may have any suitable number of teeth. The gear teeth may also have any suitable pitch. The joint sections and/or the connecting rods may be three-dimensionally printed. Alternatively, the joint and/or connecting rod sections can be manufactured using electro discharge machining (EDM). For example, this may be wire EDM. The pivot pins or axles mat be made out of any suitable material such as metal or plastic. For example, they may be brass or steel.

FIG. 4 presents a close-up example of one of the joint sections within the continuum robot arm. In this figure, first section 21*a*, has connecting rods 22*a* and 22*b* mounted to it. The connecting rods are mounted at solid points along the body and 22a fastened at about a third of the length of the first section and the second connecting rod connected at about two thirds of the length. The positioning of the connecting rods allows for the gear teeth to join in the centre of the section. The first section 21a is connected to a second sections 21b. The sections are linked by the connecting rod 22a and at the centre of the sections being connected by intermeshing gears. In this figure a close-up of the sections the channel at the centre of the joint can be seen. The channel is shown having supports 27 in it to help protect any conduits that run through the centre of the arm. The joint sections also show a plurality of channels 25 that allow the tendons of the actuator to pass through. The actuator tendons can be connected to the joint section using any suitable connection. This may be a physical connection to the joint such as by solder, brazing or welding the cable to the joint section. Alternatively, it could be a passive connection such as by using a ferrule or a crimped end of the cable that prevents the cable form being retracted through the channel passageway of the actuator cable. The system may be driven by actuator cables on both sides of the arm. Alternatively, the joint section can be driven by an actuator cable positioned at one side of the joint, whilst the tendon on the under-side is held at a constant force. The displacement of the lower cable can be used to compensate for stretch of the upper cable. The connecting rod on the outside of the joint section is connected by a central pin that allows the main body of the joint section to pivot about so that the adjacent sections of the joint can the angularly move relative to each other and can move between teeth on the gear ends of the connecting rods. The use of the teeth means that a degree of fine movement of the arm is lost, however, once the gears are meshed it prevents the arm moving between states; this act to make the arm more rigid.

FIG. 5 presents an example of a length of continuum arm section of the robot having a bent shape. In this some of the gear teeth 23 on the side of the connecting rods 22a, 22b, 22c, 22d, 22e have been moved along their positions; this is the result from the tensioning of the actuator cables by movement of the actuator that is held within the actuator pack. If the tendons are run in channels around the outside of the annular centre of the sections 21a, 21b, 21c, 21d, 21e then all the cables relating to that side of the arm pass through the same side, so that when tension is applied, they act together to deform that side of the arm, slackening of the tension of the cables for the other side will be needed if present; this can be done whilst maintaining the force in the cable. Correcting the deformation can be done by pulling releasing the tension in the one side whilst increasing the tension in the other. Or releasing the tension in one cable and allowing the force in the other cable to pull the system closer to the normal state. The connecting rod is coupled to the pivot points of the joints, so that they can move relative to each other. The limit of the radius of curvature of such a system is limited by the size of the joints and the length of the connecting rod. Thus, the shape is defined by the geometry of the arm and there is less of an effect caused by the load that is applied to the arm. This means that the system is more predictable in its deformation. Consequently, any robot arm employing such a system requires less control and sensing systems to determine the position and shape of the robot arm. This has the potential to make the arms less expensive. The lack of lockout sections reduces the risk of tendon cable damage. The arm is less susceptible to out of plane loads. Therefore, an arm accommodating these features can be used in a greater number of processes. The disadvantage is that there is only one plane of bend that the robot can undergo.

Although the examples above show the arm having 1 degree of freedom it is possible to create a system having two or more degrees of freedom. This could be achieved with having alternated joint sections being connected with their plane of movement off set by 90° relative the other joint section. For example, this could be achieved by having a joint section having the second side intermeshing gears and the connecting rods associated with this side being offset by 90° relative to the first side. In such cases the routing of the cables of the channels around the core will need to be adapted to allow for the increased complexity. Such a design configuration will also act to increase the bend radius of the robot arm, and so smaller joint sections may be required to achieve the same bend radius as a design having one just a single degree of freedom. The two-degree freedom of movement example may have one or two intermeshing gears on the first or second end. The two-degree freedom of movement example may have one or two connecting rods on the first or second end. The number of connecting rods or intermeshing gears may be different between eh first and second end. For example, the first end may have two connecting rods and only one intermeshing gear, whilst the second end has two intermeshing gears and only one connecting rod. The two-degree freedom of movement examples may be made out of the metallic or plastic materials and can be manufactured using any suitable process—similar to the discussion for the single degree of freedom example.

The arm either having continuous sections of connected via connecting rods or alternate gear arm sections may not require the use of actuator cables instead each section may be provided with its own motor to drive the joint. In such a case electrical cables will need to be provided to the motor housed within the joint. Only one motor is required per joint. Alternatively, the arms may have a pully that allow the arm to be used to bend a certain amount. This reduces the requirements for a costly and complex actuator pack. The latter may be helpful if the arm is to perform a very specific task. The connecting rod may be interchangeable. This will allow the connecting bar with the gears to have different sizes and pitch of gear teeth, so that they can be varied to allow the greater or lesser control of the movement of the arm movement and bending. Such a system would allow the arm to be used on different applications. It also allows for an ex-situ construction of the robot. This means that the robot arm could be created from a kit of parts. The cross section of the arm joint sections does not need to be circular. The shape may be elliptical, oval or circular or rectangular. The use of an oval allows for the increase in the width due to the presence of the connecting rods with the gear teeth. The arm may be placed within a skin or sleeve. This can prevent the arm from snagging on the entrance port of any edge within the work area.

The skin or sleeve can also protect the work area against contact from the arm against it. Any such contact may result in scratches, which could damage coatings.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A section of a continuum arm robot, the section comprising:
   a joint section having an annular cross-section, a plurality of channels for actuator cables of the continuum arm robot passing through the joint section;
   a pair of pivot points at a first and second ends of the joint section; and
   first and second connecting rods connected to the joint section and joined to each other at a centre of the joint section, the connecting rods having at opposed peripheral ends thereof a plurality of gear teeth that intermesh at the centre of the joint section,
   wherein the first and second connecting rods are connected to the joint section such that a first set of the plurality of channels is located above the first and second connecting rods and a second set of the plurality of channels is located below the first and second connecting rods.

2. The section of a continuum arm robot according to claim 1, wherein the first and second connecting rods have between 2 and 7 teeth at each of the opposed peripheral ends.

3. The section of a continuum arm robot according to claim 1, comprising a hole in the joint section.

4. The section of a continuum arm robot according to claim 1, further comprising two connecting rods identical to the first and second connecting rods provided on a side of the joint section opposite to that on which the first and second connecting rods are provided.

5. The section of a continuum arm robot according to claim 1, wherein the joint section is made from a plastic or metallic material.

6. The section of a continuum arm robot according to claim 1, wherein the first and second connecting rods are made from a plastic or metallic material.

7. The section of a continuum arm robot according to claim 1, wherein at least one of the first and second connecting rods is removably connected to the joint section.

8. The section of a continuum arm robot according to claim 1, wherein the joint section has an oval or elliptical shape with the first and second connecting rods being positioned on sides of the joint section having a smaller radius than other sides of the joint section.

9. The section of a continuum robot according to claim 1, wherein the pivot points at the first and second ends of the joint section also each comprise a plurality of gear teeth.

10. A continuum arm robot system, comprising
    a manipulatable section constructed from a plurality of the joint sections according to claim 1,
    wherein adjacent sections of the plurality of joint sections are connected by the first and second connecting rods and the pivot points at the first and second ends of a said joint section interact with the pivot points at the ends of adjacent joint sections.

11. The continuum arm robot according to claim 10, wherein each joint section of the plurality of joint sections is coupled to a pair of actuator cables mounted on either side of the joint section.

12. The continuum arm robot according to claim 11, wherein the manipulable section is connected to an actuator pack, which is mounted to a proximal end of the continuum arm robot.

13. The continuum arm robot according to claim 10, wherein each joint section of the plurality of joint sections has an electric motor or a piezo electric actuator.

14. The continuum arm robot according to claim 10, wherein a first pair of joint sections of the plurality of joint sections are mounted so that the first and second connecting rods are aligned in a same axis, and a second, adjacent pair of joint sections of the plurality of joint sections have the first and second connecting rods aligned in an axis orthogonal to the first pair of joint sections.

* * * * *